Figure 1:
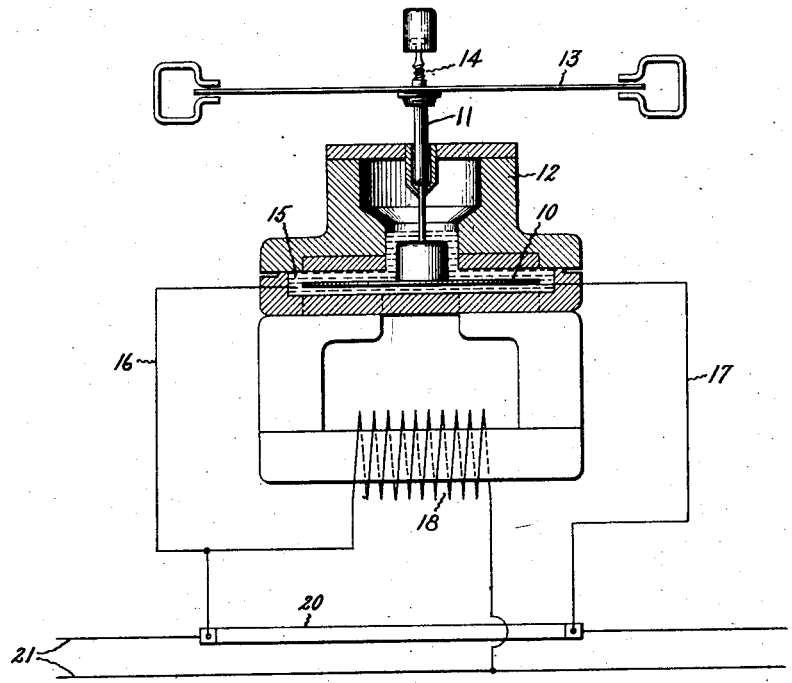

Aug. 30, 1927.

F. P. CHURCH

MERCURY METER

Original Filed Jan. 16, 1925

1,640,439

Inventor:
Frederic P. Church,
by
His Attorney.

Patented Aug. 30, 1927.

1,640,439

UNITED STATES PATENT OFFICE.

FREDERIC P. CHURCH, OF LYNN, MASSACHUSETTS, ASSIGNOR TO GENERAL ELECTRIC COMPANY, A CORPORATION OF NEW YORK.

MERCURY METER.

Application filed January 16, 1925, Serial No. 2,947. Renewed May 14, 1927.

My invention relates to mercury meters and more in particular to the rotor of such meters and an improved process for treating the same to the end that the useful life of the rotor may be materially increased, the friction of the meter decreased and its accuracy increased.

Up until recently the standard form of rotor for mercury meters consisted of an ordinary disc of amalgamated copper. The copper disc is generally punched from sheet copper, cleaned and then amalgamated. The amalgamating process is preceded by treating the rotor with mercuric nitrate, after which it is washed and immersed in a bath of mercury and the mercury agitated by air, the air having been passed through caustic soda to remove moisture and impurities. This last step, called the ageing process, generally lasts for about 24 hours during which time the surface of the copper disc is amalgamated.

A rotor so treated is subject to certain inherent defects which my present invention has substantially eliminated. It is desirable that the rotor of a mercury meter should have a constant resistance throughout the life of the meter. It is also desirable that the rotor surface be smooth and remain smooth during the life of the meter. A change in either of these factors will produce errors which will require frequent recalibration of the meter. An ordinary copper punched rotor contains impurities and even though these impurities are apparently covered up by the amalgamated surface, they continue to react with the mercury of the meter chamber after the meter is in use and slowly but continually change the resistance of the rotor as more and more mercury penetrates into the copper punching which slowly dissolves. The impurities which are dissolved form a scum on the surface of the mercury which clings to the shaft and increases the friction losses of the meter. The surface of the rotor which was originally fairly smooth becomes more or less pitted, also increasing the friction losses. Such an instrument must be calibrated frequently and finally the rotor reaches the condition where the meter is no longer serviceable. Due to these defects the life of the rotor of a mercury meter has been recognized as a limiting factor in determining the useful life of a meter and these defects have been a source of trouble during the life of the meter.

In my copending application, Serial No. 649,385, filed July 3, 1923, entitled "Mercury meter" which application is assigned to the same assignee as the present invention, I have described a treatment for the rotors of mercury meters which consists in electroplating the usual rotor with a chemically pure coating which greatly increased the life and accuracy of the meter. My present invention relates to a further improvement in the same direction the essential feature of which is an initial treatment of the rotor, before the final electroplating, with a metal having no affinity for mercury. I have discovered and demonstrated by life tests that such treatment is especially beneficial as regards the preservation of the rotor, both mechanically and electrically.

The features of my invention which I believe to be novel and patentable will be pointed out in the claims appended hereto. The process of treatment which I have found to be best will now be described. The type of meter to which my invention is applicable is represented in Fig. 1 and Fig. 2 shows a rotor of such a meter representing treated and untreated portions on its surface.

Figure 2:
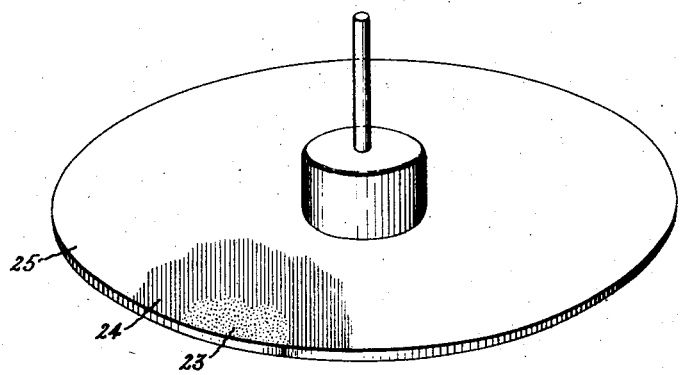

Referring to Fig. 1, 10 represents the rotor mounted on a shaft 11 which passes through the upper wall of the mercury chamber 12. The upper portion of the shaft is provided with the usual damping disc 13 and a worm 14 for communicating its motion to a registering train, not shown. The rotor 10 is completely immersed in mercury 15. Current is conveyed to and from the mercury chamber by the leads 16 and 17. The current in passing through the rotor 10 reacts against the field supplied by the magnet 18 and causes rotation in a well understood manner. The rotor circuit of the meter is shown as being connected across a line shunt 20 while the field is connected across the supply line 21.

It will be evident that the accuracy of the meter will depend upon a constant resistance of the rotor circuit and constant friction losses. As previously mentioned, exposed impurities in the rotor will continually react with the mercury and change the resistance of the rotor with respect to the shunt, necessitating frequent calibration. The rotor surface will become rough; a scum will form on the surface of the meter and cling to the shaft 11, causing a change in the friction losses and finally, the rotor reaches such a condition as to render the meter unserviceable.

These defects are substantially eliminated by my improved process of treating the rotor in which the usual copper punchings for the disc are first cleaned and then subjected to a treatment, preferably an electrolytic treatment, with a metal having no affinity for mercury. By this I mean a metal which cannot be wet by mercury and which amalgamates very slowly with mercury, if at all. Such metals are cobalt, iron or nickel, cobalt being preferable, and then a second treatment for depositing a chemically pure coating which will readily unite with mercury, such as copper, silver, tin or zinc. The best results are obtained as follows: 1st, take a copper rotor of standard rolled copper such as is usually used and clean thoroughly; 2nd, give it a very thin coating of cobalt by electroplating in a cobalt solution for about one minute; and 3rd, give it a copper coating by electroplating for about 20 minutes in an acid solution. The rotor should then be washed to remove all traces of acid and amalgamated. There being no impurities to be removed, no ageing process is necessary.

In Fig. 2, the untreated surface of the copper punching is indicated at 23, the first coating of cobalt is indicated at 24, and the final coating of copper is indicated at 25.

As described in my copending application, the outer coating of chemically pure copper is very smooth and compact and in itself greatly improves the life and usefulness of the rotor. However, with only the one coating of chemically pure copper, the mercury slowly penetrates into the rotor and in time will change its resistance to such an extent as to necessitate recalibration. The intermediate coating of cobalt seems to form a barrier past which the mercury does not pass or at least to a practically unnoticeable extent after a year's continuous operation. The rotor is thus preserved indefinitely both as regards its smoothness and resistance. Also, there are fewer impurities which will be forced into the mercury solution to form as a scum on its surface. Because the rotor surface is perfectly smooth and remains smooth in operation and because the surface of the mercury remains free from scum, the meter friction is low and practically constant. The low friction losses result in greater accuracy on light loads and overloads.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. A rotor for mercury meters comprising a disc of low resistance metal with two electrolytic coatings, the first coating being of cobalt and the second and outer coating being of a metal which will readily unite with mercury.

2. A rotor for mercury meters comprising a disc of copper having a first coating of cobalt and a second and outer coating of substantially chemically pure copper.

3. In a mercury meter, a conductor element exposed to the mercury, said conductor element comprising a metallic conductor body provided with two substantially chemically pure coatings, the first coating being of a metal having no affinity for mercury and the second and outer coating being of a metal which will readily unite with mercury.

In witness whereof I have hereunto set my hand this 15th day of January, 1925.

FREDERIC P. CHURCH.